(12) United States Patent
Chan et al.

(10) Patent No.: US 12,100,013 B1
(45) Date of Patent: Sep. 24, 2024

(54) USING BLOCKCHAIN TO IMPROVE STANDARDS COMPLIANCE

(71) Applicant: Intuit, Inc., Mountain View, CA (US)

(72) Inventors: Christopher Mankit Chan, San Jose, CA (US); Jothimani Kanthan Ganapathi, Castro Valley, CA (US); Jason Daniel Taylor, Sunnyvale, CA (US); Jason Michael Webb, Valley Center, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/133,499

(22) Filed: Apr. 11, 2023

(51) Int. Cl.
*G06Q 20/38* (2012.01)
*G06Q 30/018* (2023.01)

(52) U.S. Cl.
CPC ....... *G06Q 30/018* (2013.01); *G06Q 20/3825* (2013.01); *G06Q 20/389* (2013.01)

(58) Field of Classification Search
CPC . G06Q 30/018; G06Q 20/3825; G06Q 20/389
See application file for complete search history.

(56) References Cited

U.S. PATENT DOCUMENTS

| | | | | |
|---|---|---|---|---|
| 11,798,244 B1* | 10/2023 | Witchey | ............... | G06T 19/003 |
| 2021/0390531 A1* | 12/2021 | Voorhees | ............ | G06Q 20/367 |
| 2022/0138640 A1* | 5/2022 | Augustine | ............... | G06F 16/27 |
| | | | | 705/5 |
| 2022/0274703 A1* | 9/2022 | Di Cosola | ........ | G06Q 10/06315 |
| 2023/0004970 A1* | 1/2023 | Jakobsson | ............ | G06Q 20/407 |
| 2023/0070586 A1* | 3/2023 | Kapur | .................. | G06Q 20/123 |
| 2023/0078852 A1* | 3/2023 | Campbell | ............... | G06F 16/29 |
| | | | | 705/7.11 |
| 2023/0117344 A1* | 4/2023 | Burchard | .............. | H04L 9/3263 |
| | | | | 713/155 |
| 2023/0185996 A1* | 6/2023 | Jenrola | ................. | G06F 21/602 |
| | | | | 703/22 |
| 2023/0274245 A1* | 8/2023 | Quigley | ................. | G06Q 20/02 |
| | | | | 705/65 |

\* cited by examiner

*Primary Examiner* — Patrick Mcatee
*Assistant Examiner* — Nakia Leffall-Allen
(74) *Attorney, Agent, or Firm* — Dinsmore & Shohl LLP

(57) ABSTRACT

Certain aspects of the disclosure provide a method for transferring an achievement token, comprising: receiving a request to transfer an achievement token to a user; querying a smart contract to obtain a requirement associated with the achievement token; verifying, via a blockchain, the user completed the requirement, including retrieving user evidence associated with the requirement from the blockchain; and storing user evidence with a transaction history associated with the transfer of the achievement token to the user; and transferring, via the blockchain, the achievement token to the user.

20 Claims, 11 Drawing Sheets

USING BLOCKCHAIN TO IMPROVE STANDARDS COMPLIANCE

INTRODUCTION

Aspects of the present disclosure relate to improving standards compliance via a blockchain.

Compliance with standards is crucial in many industries. For example, compliance with safety standards ensures that all manner of products are fit for use by consumers. Part and parcel with maintaining compliance with standards is maintaining records of such compliance.

Conventional methods for recording compliance with standards rely on individuals manually tracking and monitoring activities. For example, compliance records may include checklists and other documentation of processes that are completed manually by individuals. However, these manual methods rely on the aspiration of all involved individuals being accurate, precise, and complete. This aspiration is rarely realized and errors abound. Moreover, implicit and explicit biases in both data collection and recordation may result in compliance issues. Further yet, compliance records are often not available to an entire organization, which limits transparency. These various issues primarily arise from the manual nature of conventional compliance systems.

Accordingly, there is a need in the art for a technical solution to improve compliance efforts by reducing record keeping errors and providing transparency with respect to compliance records.

SUMMARY

Certain aspects provide a method, comprising, receiving a request to transfer an achievement token to a user; querying a smart contract to obtain a requirement associated with the achievement token; verifying, via a blockchain, the user completed the requirement associated with the achievement token, comprising; retrieving user evidence associated with the requirement associated with the achievement token from the blockchain; and storing user evidence with a transaction history associated with the transfer of the achievement token to the user; and transferring, via the blockchain, the achievement token to the user.

Further aspects provide a method, comprising: receiving, from a first user, a request to transfer an appreciation token to a second user; receiving, from the first user, a justification associated with the appreciation token; verifying the justification associated with the appreciation token; recording the justification associated with the appreciation token onto a blockchain, comprising: retrieving user evidence associated with the justification associated with the appreciation token from the blockchain; and storing user evidence with a transaction history associated with the transfer of the appreciation token to the second user; and transferring, via the blockchain, the appreciation token to the second user.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
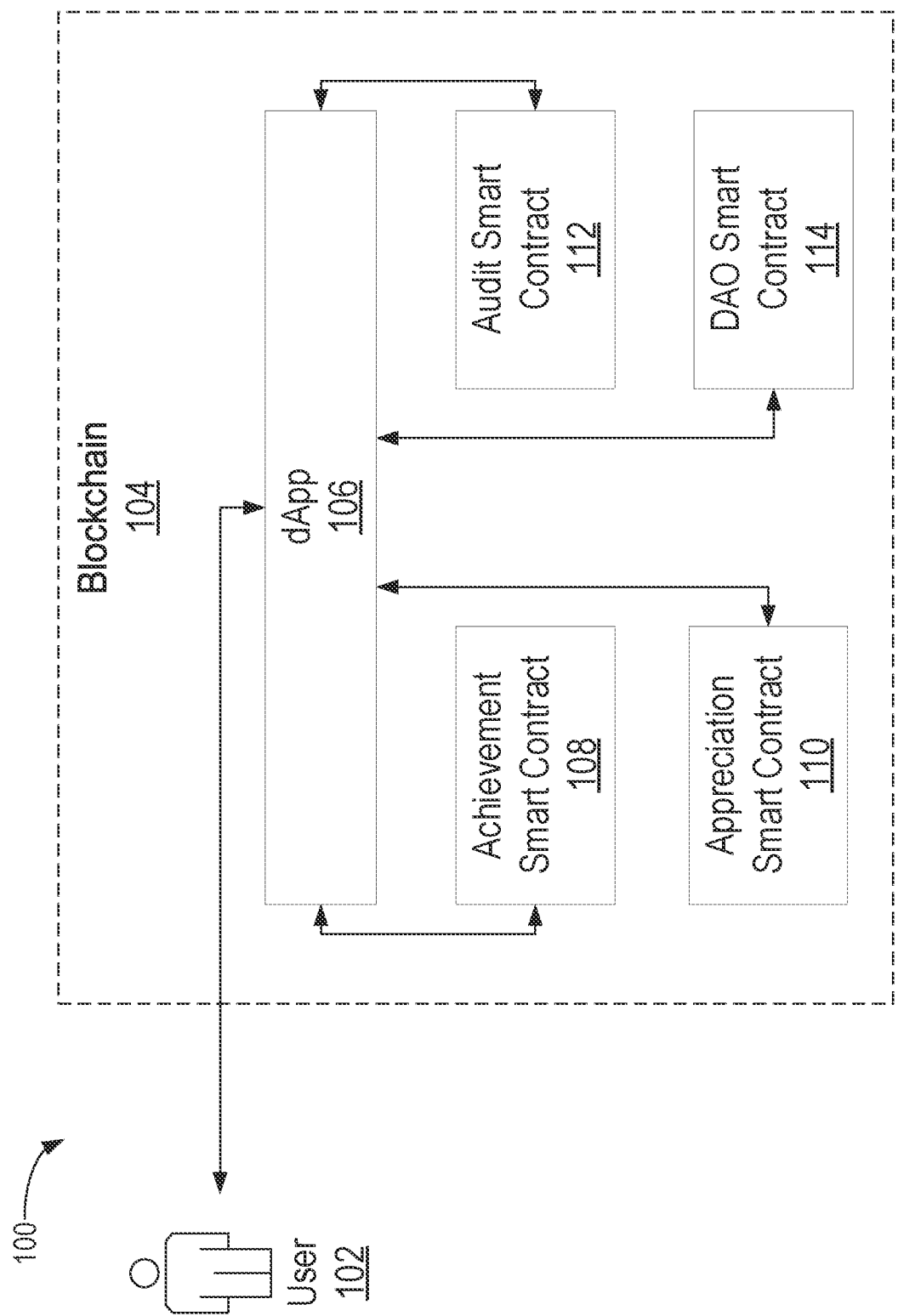
FIG. 1 depicts an example system for encoding compliance aspects onto a blockchain.

Aspects described herein are directed to systems, methods, processing systems, and computer-readable mediums for improving standards compliance utilizing a blockchain.

Record creation and management is an important aspect of ensuring standard compliance. Standards may generally include best practices, regulations, and technological standards, among others. Failure to comply with such standards may have grave consequences. For example, a product that fails to heed a safety standard may significantly injure a user, which may then lead to legal liability, reputational harm, etc. Thus, accurate records must be created and maintained to reflect both successful and failed compliance. However, as discussed above, many technical problems exist in the art with conventional recordation methods for ensuring compliance. Often such conventional methods result in compliance records that are incomplete, inaccurate, and which may not be transparent to relevant members of a community.

Embodiments described herein are directed to systems and methods for improving standards compliance using a blockchain. For example, embodiments described herein may utilize various token transfers to encode various compliance-related activities onto the blockchain. Beneficially, blockchain transactions are visible to other blockchain users, thus, the community may readily audit standards compliance via the blockchain. Further, because a blockchain provides an immutable record of transactions, such transactions cannot be subsequently altered, thus ensuring compliance records are authentic. Blockchains thus provide a technical solution to conventional shortcomings with methods of recording and tracking compliance.

Further embodiments described herein utilize smart contracts to ensure conformity with standards. Smart contracts maintain data on the blockchain to execute operations and may be configured to automatically run once conditions set in a contract are met. Smart contracts thus offer a technical solution within the technical environment of a blockchain to ensure that standards are met (e.g., by meeting various conditions) and to issue tokens memorializing such compliance that are auditable by a relevant audience.

Further embodiments described herein enable decentralized autonomous organizations (DAOs) for community policing and standard setting. Generally, a DAO is a community without a central authority. Operations by a DAO are executed after members of the community propose, vote, and approve such operations. As used herein, members of a DAO may add additional standards (or conditions) to be implemented and encoded by smart contracts, such as those described herein. The blockchain and smart contracts thereby provide a technical solution for enabling DAO and community members to recognize and encourage standards compliance.

Embodiments described herein therefore generally relate to a transparent and immutable record system (e.g. implemented by a blockchain) for rewarding compliance and achievement and thereby promote compliance and achievement of standards and best practices. In one example, aspects described herein may be used to encode compliance with standards into a blockchain using achievement tokens, which are representative of an individual or organization's compliance with a particular standard. In another example, aspects described herein may be used to encode compliance with community standards into a blockchain using appreciation tokens representing an individual or organization's compliance with a standard.

Example System for Encoding Compliance onto a Blockchain

FIG. 1 depicts an example system for encoding compliance aspects onto a blockchain.

Figure 2:
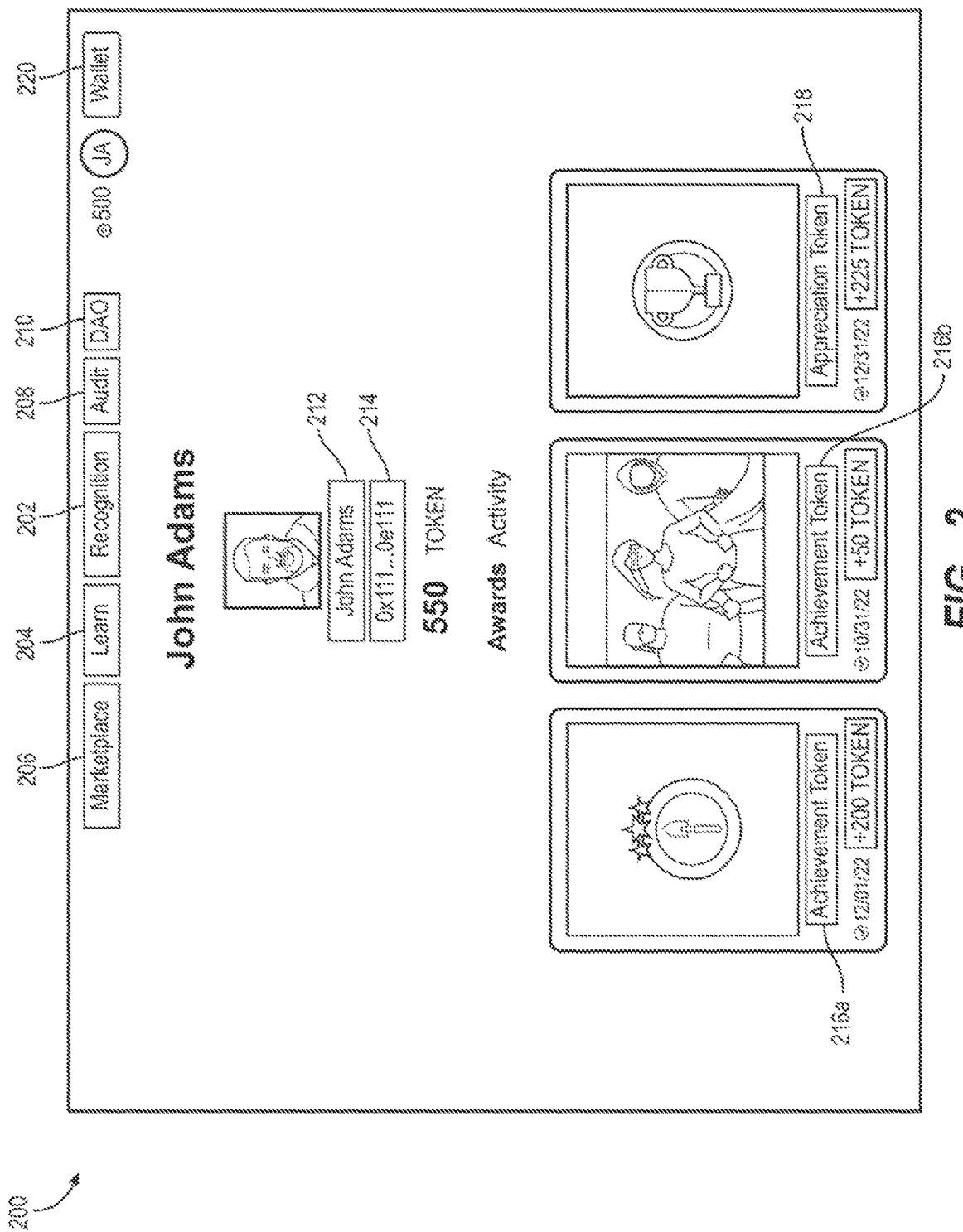
FIG. 2 depicts an example user interface for interacting with a blockchain.

Generally, a user 102 may transact with blockchain 104, for example, to send tokens, operate smart contracts, or interact with a decentralized application (dApp), such as dApp 106. In this example, dApp 106 operates on blockchain 104 as a facilitator of peer-to-peer transactions. In some examples, dApp 106 may operate applications for financial services, supply chain management, real estate, healthcare, education, social media, gaming, and other services. dApp 106 may also contain a user profile, for example, a user profile associated with user 102. As described in further detail below, FIG. 2 depicts an example user interface view of a user profile.

Blockchain 104 also hosts achievement smart contract 108. In this example, achievement smart contract 108 is depicted separately from dApp 106, although in some examples, achievement smart contract 108 may form part of dApp 106. Achievement smart contract 108 operates the achievement token, including transfers of achievement token, such as those described in FIG. 3.

Further, blockchain 104 hosts appreciation smart contract 110. In this example, appreciation smart contract 110 is depicted separately from dApp 106, although in some examples, appreciation smart contract 110 may form part of dApp 106. Appreciation smart contract 110 operates the appreciation token, including transactions with the appreciation token, such as those described in FIG. 4.

Furthermore, blockchain 104 hosts audit smart contract 112. In this example, the appreciation smart contract is depicted separately from dApp 106, achievement smart contract 108 and appreciation smart contract 110, although in some examples appreciation smart contract may form part of any of dApp 106, achievement smart contract 108, and appreciation smart contract 110. Appreciation smart contract 110 may audit transactions with the achievement token and the appreciation token, such as those described in FIG. 5.

Further, blockchain 104 hosts DAO smart contract 114. In this example, DAO smart contract 114 is depicted separately from dApp 106, although in some examples, DAO smart contract 114 may form part of dApp 106. DAO smart contract 114 operates the DAO, including voting on new tokens, such as those described in FIG. 6.

Note, that in this example, smart contracts for achievement and appreciation tokens are described, however, other smart contract tokens are possible.

Example User Interface for Interacting with a Blockchain

FIG. 2 depicts an example user interface 200 for interacting with a dApp, such as dApp 106, as described with respect to FIG. 1.

In this example, user interface 200 displays a user profile, such as a user profile associated with user 102 in FIG. 1.

Recognition Component 202 allows a user to send appreciation token 218 to other blockchain users, such as through flow 400, described below with respect to FIG. 4.

Learn Component 204 allows a user to earn achievement token 216a or achievement token 216b, such as through flow 300, described below with respect to FIG. 3.

Marketplace Component 206 allows a user to transact on the blockchain, such as blockchain 104 in FIG. 1.

Audit 208 allows a user to request an audit of a token transfer, such as through flow 500, described below with respect to FIG. 5.

DAO 210 connects a user to a DAO. DAO 210 may be operated by DAO smart contract 114 in FIG. 1.

User profile identifier 212 may be an identifier associated with the user, such as a username, name, or other identifier of the user.

Public address 214 is a public address associated with wallet 220, for a user to transact via the blockchain.

Achievement token 216a and 216b are each a token associated with an achievement. In some aspects, an achievement token 216a or 216b may be a non-fungible token (NFT). Achievement token 216a or 216b may be operated by achievement smart contract 108 in FIG. 1.

Appreciation token 218 is a token associated with appreciation. Appreciation token 218 may be operated by appreciation smart contract 110 in FIG. 1. In some aspects, appreciation token 218 may be a fungible token, such as an ERC-20 type token.

Example Flowchart for Transferring an Achievement Token

Figure 3:
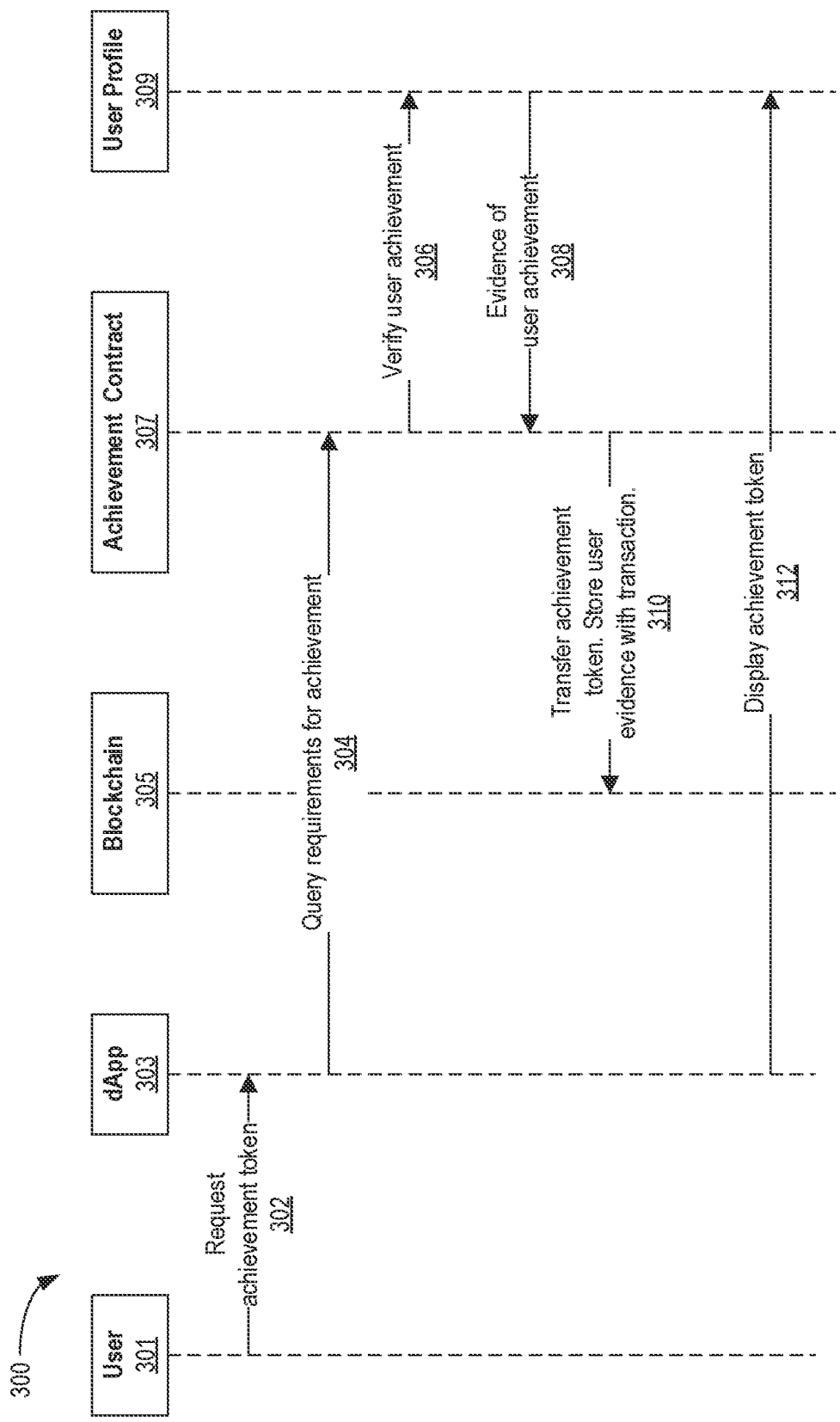
FIG. 3 depicts an example flow chart for transferring an achievement token.

FIG. 3 depicts an example flow 300 for transferring an achievement token, such as with an achievement smart contract, for example, achievement smart contract 108, as described with respect to FIG. 1.

Initially, flow 300 begins at step 302 with a user 301 requesting an achievement token from a dApp 303. In some examples, the dApp 303 may be dApp 106, depicted in FIG. 1 and the achievement token may be achievement token 216a or 216b, as described in FIG. 2. In this example, the achievement token represents a particular user achievement. Beneficially, when a user receives a particular achievement token, evidence of the achievement is recorded onto the blockchain, whereby other blockchain users may trust the user has complied with the requirements associated with that particular achievement token.

In some examples, the requirements associated with an achievement token may be standards such as best practices, regulations, and technological standards. Specifically as one example, technological standards for deploying a new smart contract on a blockchain, may be set as the requirements for an achievement token.

At step 304, the dApp 303 queries a smart contract 307 associated with the achievement token for requirements of the achievement token. In some examples, the smart contract is achievement smart contract 108 in FIG. 1.

At step 306, the achievement smart contract 307 verifies the user 301 has met the requirements of the achievement token. In this example, the achievement smart contract 307 verifies the requirements with a user profile 309, for example, a user profile associated with the dApp. In other examples, the achievement smart contract 307 may verify the requirements with a remote service, such as a third-party application connected to the dApp 303.

Returning to the technological standards for deploying a new smart contract on a blockchain example, the achievement smart contract verifies the user has meet the requirements, by verifying the user's deployment of the new smart contract met the technological standards, embodied as requirements in the achievement contract.

At step 308, the user profile 309 sends evidence associated with the user achievement to the achievement smart contract 307. In some embodiments, user evidence is already present on the blockchain and the user evidence is not presented to the blockchain. For example, where the requirement associated with the achievement token is the user profile is older than a year, the user profile may send evidence, such as a user profile creation date, to the achievement smart contract.

Returning to the technological standards example above, the user profile sends evidence associated with the deployment of the new smart contract meeting the technological standards, such as a programming language of the smart contract.

In some embodiments, user evidence is not already present on the blockchain, and user evidence is presented to the blockchain. For example, a blockchain address recognized by the achievement smart contract, such as a blockchain address owned by a trusted third-party, may sign a transaction to certify the user met the requirements of the achievement token. Further, in some cases, tokens may be transferred from the blockchain address as a reward, such as to reward a user successfully detecting and reporting fraud to a DAO.

At step 310, the achievement smart contract 307 executes a transfer of the achievement token to the dApp 303, via the blockchain 305. In some embodiments, the achievement token is an NFT.

At step 312, the dApp 303 displays the achievement token, for example an NFT, on the user profile 309, for example, as depicted in FIG. 2. Returning to the previous technological standards example, the achievement token may indicate the achievement of deploying a new smart contract meeting technological standards, such that a user holding the achievement token has met the technological standards.

Beneficially, then, holding an achievement token indicates the standards associated with that achievement have been complied with, reducing the need for independent and redundant verification. This may reduce the number of transactions, and processing and energy needed to ensure standards compliance. Additionally, because the standards are enforced via a smart contract, the standards cannot be readily tampered or altered. Furthermore, the smart contract will record the transaction onto the blockchain providing an immutable record, which may be audited, such as described below with respect to FIG. 5.

Note that flow 300 is just one example, and other flows including fewer, additional, or alternative steps, consistent with this disclosure, are possible.

Example Flowchart for Transferring an Appreciation Token

Figure 4:
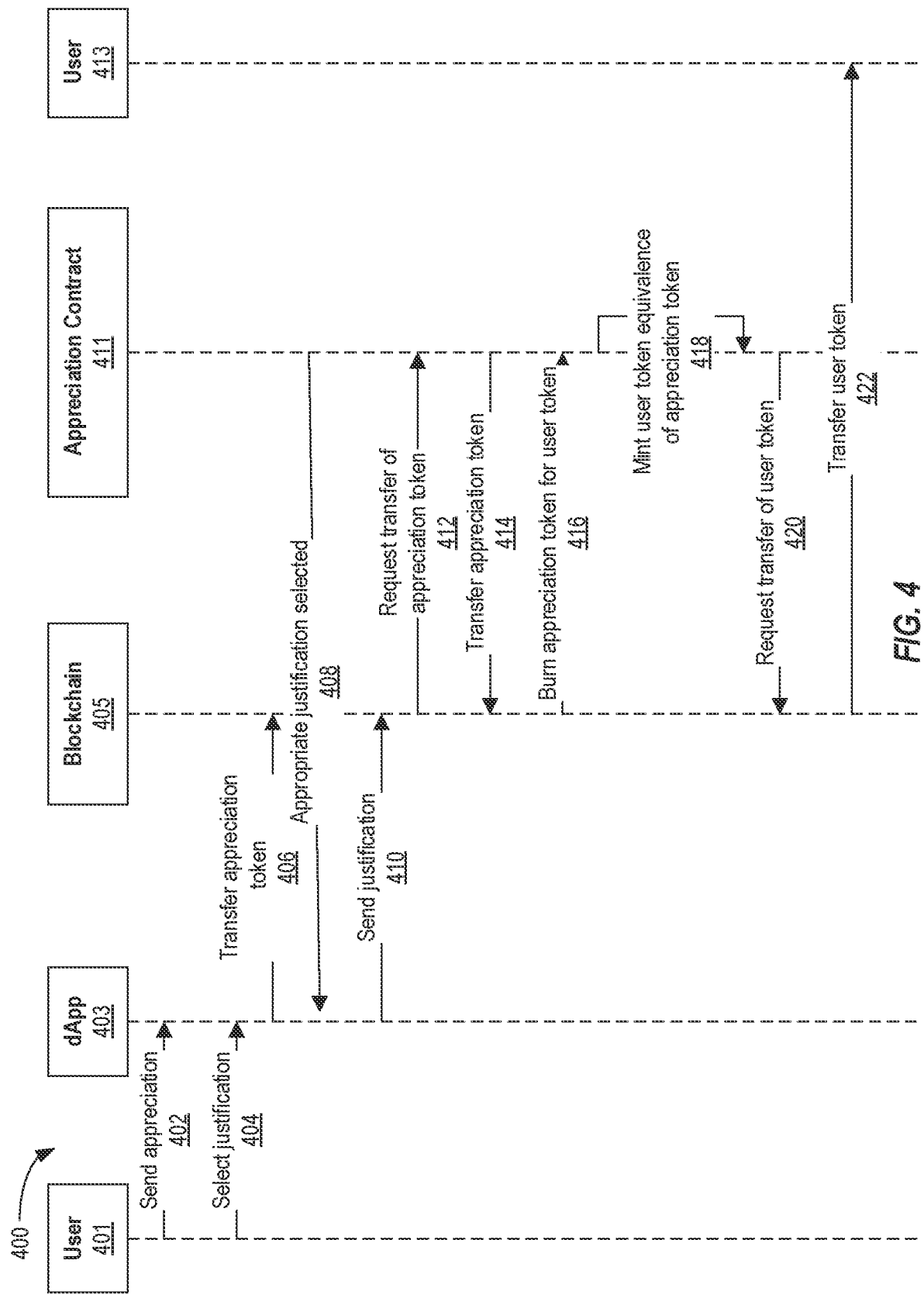
FIG. 4 depicts an example flowchart for transferring an appreciation token.

FIG. 4 depicts an example flow 400 for transferring an appreciation token, such as with an appreciation smart contract, for example, using an appreciation smart contract 110, as described with respect to FIG. 1.

Initially, flow 400 begins at step 402 with a user 401 calling a transfer of an appreciation token from a dApp 403, such as dApp 106, depicted in FIG. 1. This appreciation token represents user to user appreciation. Beneficially, an appreciation token can only be transferred to another user as a gift in recognition of the other user's activities, allowing community encouragement and recognition of standards compliance. For example, a user may transfer an appreciation token as recognition of another user's compliance with a standard or exceeding a standard, such as an improvement to a technological standard.

At step 404, the user 401 selects a justification associated with the transfer of appreciation token. In some aspects, a justification may be a user meeting or exceeding a standard, for example, a user may select a justification that the recipient of the user token, user 413, exceeded a technological standard.

At step 406, the dApp 403 calls for the transfer of the appreciation token via a blockchain 405.

At step 408, the appreciation smart contract 411 verifies whether an appropriate justification is selected in associated with the transfer of appreciation token. Appropriate justifications are set as conditions within the smart contract, such that the conditions must be met, i.e., an appropriate justification is selected for the appreciation smart contract to run. In some aspects, appropriate justifications may include a recipient, e.g., user 413, met or exceed a standard. In some aspects, an appropriate justification may be a recipient, e.g., user 413, assisted in complying with a standard.

At step 410, the dApp 403 sends the justification associated with the transfer of appreciation token to the appreciation smart contract. In some aspects, the justification is recorded onto the blockchain as part of the appreciation token transfer by appreciation token smart contract. Beneficially, the particular justification selected may be audited with an audit of the appreciation token transfer, preventing scam appreciation token transfers.

At step 412, the blockchain 405 requests transfer of appreciation token on the appreciation smart contract.

At step 414, the appreciation smart contract 411 executes the transfer on the blockchain.

At step 416, the user 413 receiving the appreciation token may exchange the appreciation token for a user token. Appreciation token can only be sent in connection with a justification, set in the conditions of the appreciation token smart contract, however, a recipient of appreciation token, e.g., user 413, may receive user token, which may be used without restriction on the blockchain. Appreciation token is then burned by appreciation contract for user token. By burning, or removing from circulation, the appreciation token is removed in favor of the user token.

At step 418, the appreciation smart contract 411 calculates the user token equivalence of the appreciation token. In some embodiments, the user token smart contract mints the equivalent user token. Minting user token may include generating new and unused user token, such as by user token smart contract.

At step 420, the appreciation smart contract 411 transfers the user token to the recipient via the blockchain.

Beneficially, user 413 receives a tangible benefit on the blockchain in the form of user token, as a reflection of meeting or exceeding a standard, and the user meeting or exceeding the standard is recorded in association with the transfer as the selected justification. Additionally, by utilizing token transfers and smart contracts, appreciation token may not be transferred for unjustified activities, such as where a standard is not met. Community members may thus, recognize and encourage compliance in a transparent record, via the blockchain.

Note that flow 400 is just one example, and other flows including fewer, additional, or alternative steps, consistent with this disclosure, are possible.

Example Flowchart for Auditing a Token Transfer

Figure 5:
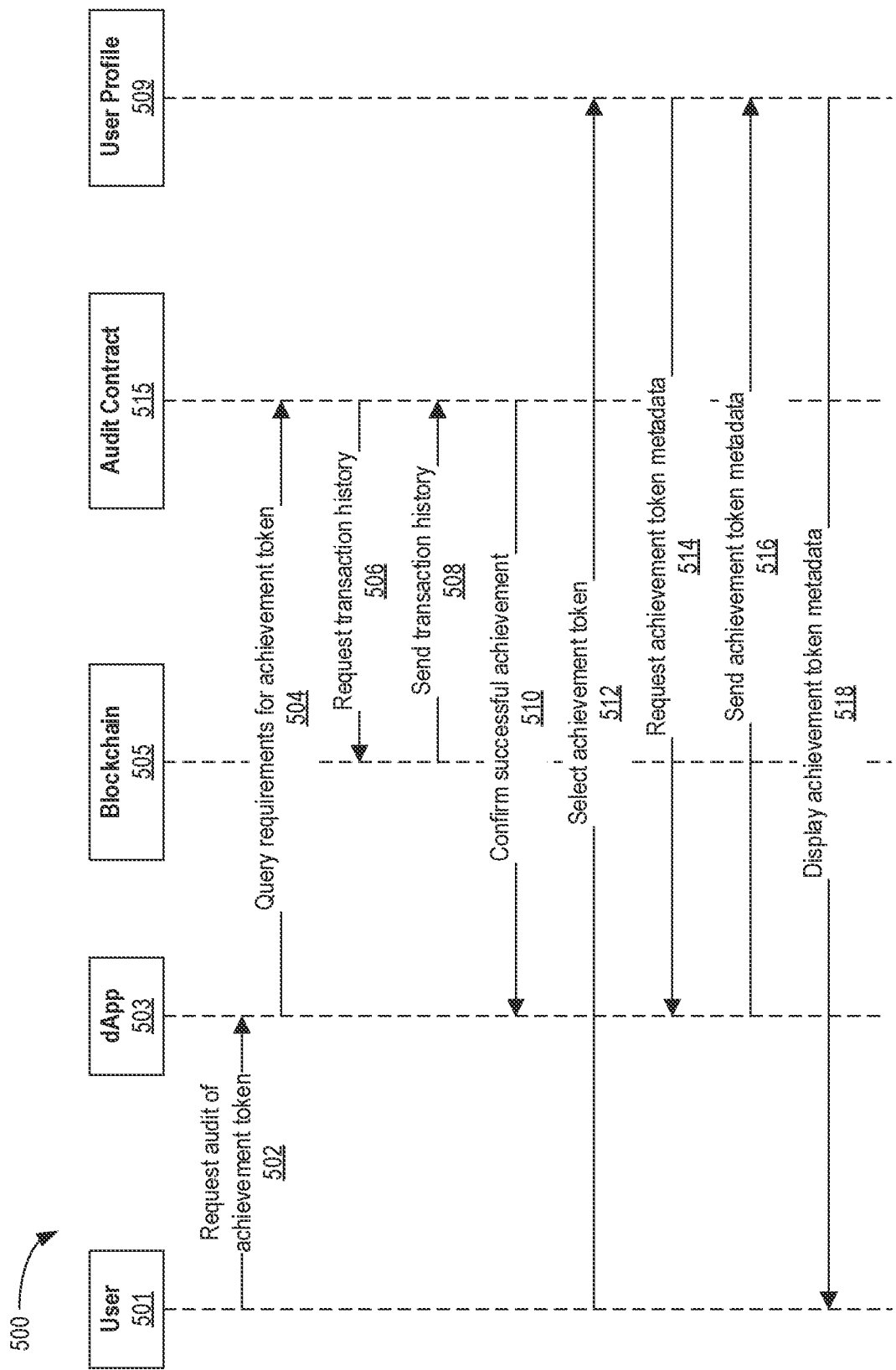
FIG. 5 depicts an example flowchart for auditing an achievement token transfer.

FIG. 5 depicts an example flow 500 for auditing transfers of achievement tokens and appreciation tokens on a blockchain. Aspects of flow 500 may be implemented by audit smart contract 112, as described in FIG. 1.

Because transfers of achievement tokens and appreciation tokens are recorded on an immutable blockchain ledger, any blockchain user may request an audit of such transfers. Beneficially, community members ensure achievement tokens and appreciation tokens are transferred in accordance with the standards enforced via the requirements and justifications set forth, Further, achievement tokens and appreciation tokens have intrinsic value due to such restrictions.

Initially, flow 500 begins at step 502 with a user 501 requesting an audit associated with an achievement token from a dApp 503. In some embodiments, the user requests an audit associated with the achievement token held by another user.

At step 504, the dApp queries a smart contract associated with the achievement token for requirements of the achievement token.

At step 506, the audit smart contract 515 requests, from the blockchain 505, the transaction history associated with the transfer of the achievement token. In some embodiments, the smart contract is an audit smart contract configured to audit transfers of achievement token. In some embodiments, the functionalities of the achievement token smart contract and the audit smart contract may be implemented in a single smart contract.

At step 508, the audit smart contract 515 receives, from the blockchain 505, the transaction history associated with the transfer of the achievement token.

At step 510, the audit smart contract 515 compares the transaction history with the requirements of the achievement token. In some embodiments, the transaction history includes evidence stored with the transfer of the achievement token. For example, evidence may include evidence associated with the user achievement, such as in the user profile age example above. In other examples, where the requirement is associated with a remote service, such as a third-party application, the evidence may include a verification from the remote service of the user achievement. Beneficially, the blockchain may be used to store data, such as evidence stored with the transfer of the achievement token, and record the transaction. The evidence of the transaction is recorded and may not be amended, erased, or otherwise altered, thus, providing a transparent record.

At step 512, the user 501 selects the achievement token on a user profile 509, such as depicted in FIG. 2. In some embodiments, the achievement token is an NFT.

At step 514, the user profile 509 requests metadata-associated with the achievement token from the dApp. Metadata associated with the achievement token may include, for example, description, name, traits, etc. of the achievement token.

At step 516, the dApp 503 sends the metadata associated with the achievement token. In some embodiments, the metadata associated with the achievement token is stored in the achievement smart contract. In some embodiments, the metadata associated with the achievement token is stored off-chain, such as in a cloud.

At step 518, the user profile 509 displays the metadata associated with the achievement token on the dApp user interface, such as depicted in FIG. 2.

Because transactions with the achievement token and the appreciation token, such as described in FIG. 3 and FIG. 4 respectively, are transparently recorded onto the blockchain, these transactions may be readily auditable by community members, to ensure standards compliance.

Note that flow 500 is just one example, and other flows including fewer, additional, or alternative steps, consistent with this disclosure, are possible.

Figure 6:
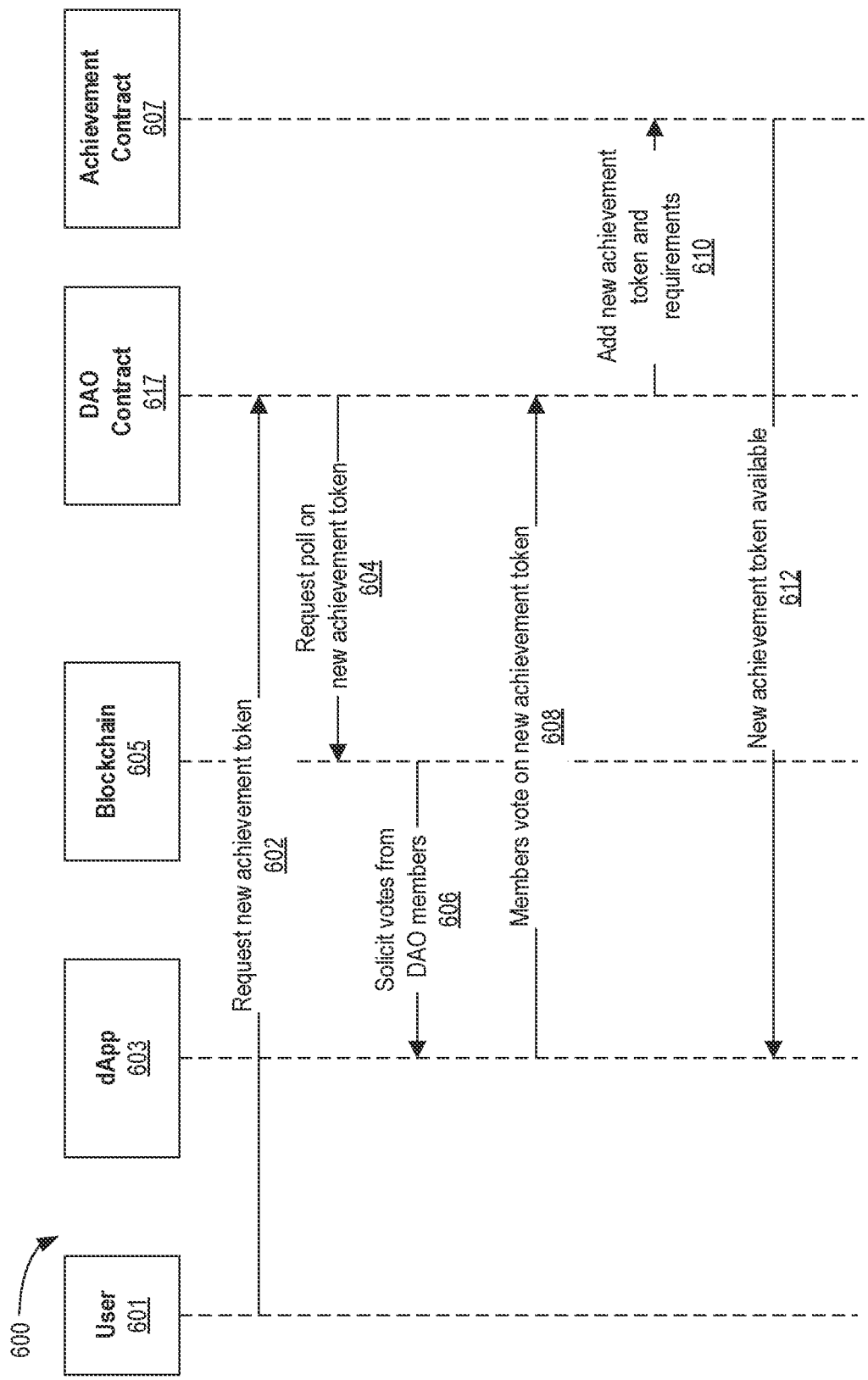
FIG. 6 depicts an example flowchart for a decentralized autonomous organization for creating new standards.

Example Flowchart for a Decentralized Autonomous Organization Creating New Tokens FIG. 6 depicts an example flow 600 for a DAO creating a new achievement token to be transferred to users, such as depicted in flow 300 of FIG. 3. Flow 600 enables community policing and standard setting, including community-led increased standards. For example, members of a DAO may recognize and encourage standards compliance by enabling members of a DAO to propose, vote and approve new achievement tokens and associated requirements (e.g., higher or standards). Because new standards are implemented through a DAO, new standards are beneficially, controlled by the community. Further, actions by the DAO are recorded on the blockchain, allowing the entire process of creating new standards to be transparent and recorded for public view.

Beneficially, then, achievement standards may adapt and build upon the mechanisms for transferring previous achievement tokens, as described in FIG. 3, and auditing transfers, as described in FIG. 5. Furthermore, flow 600 provides a technical method for DAO and community members to modify and alter standards for community compliance, without the need to recreate or completely replace the achievement smart contract, thus reducing processing and energy requirements by reusing and recycling the mechanisms encoded in the achievement smart contract.

At step 602, a user 601 proposes a new achievement token to a DAO smart contract 617. In some embodiments, the user proposes requirements associated with the achievement token for members of the DAO to vote on. A user may propose a new achievement token, for example, by submitting a new achievement name and requirements associated with the new achievement token.

At step 604, the DAO smart contract 617 requests members of the DAO to vote on the proposed achievement token via the blockchain.

At step 606, votes are solicited from members of the DAO on the proposed achievement token through the dApp 603.

At step 608, members may enter their vote in the dApp 603 to be sent to the DAO smart contract 617, for example, each member of the DAO votes by signing a multi-signature transaction. In the event a quorum of signatures is reached, dApp 603 submits the transaction to the DAO smart contract 617. If the members of the DAO approve the proposed achievement token, then flow 600 may proceed to step 610. If the members of the DAO do not approve the proposed achievement token, steps 602 through 608 may be repeated until the members of the DAO approve the proposed achievement token. In some embodiments, other users may request the new achievement token, or request one or more requirements associated with the new achievement token at step 602.

At step 610, once the members of the DAO have approved the new achievement token and the requirements, an achievement smart contract 607 is written onto the blockchain. In some embodiments, the achievement smart contract is the same achievement smart contract as in FIG. 3, thus the new achievement token is added to an existing achievement smart contract.

At step 612, the new achievement token is available on the dApp for transfer. In some embodiments, the new achievement token may be transferred through flow 300, as described with respect to FIG. 3.

Beneficially, the new achievement token and associated requirements embody new standards, set by the community for the community. Thus, the blockchain, DAO and achievement smart contracts provide a technical solution to enable DAO and community members to recognize and encourage standards compliance.

Note that flow 600 is just one example, and other flows including fewer, additional, or alternative steps, consistent with this disclosure, are possible.

Figure 7:
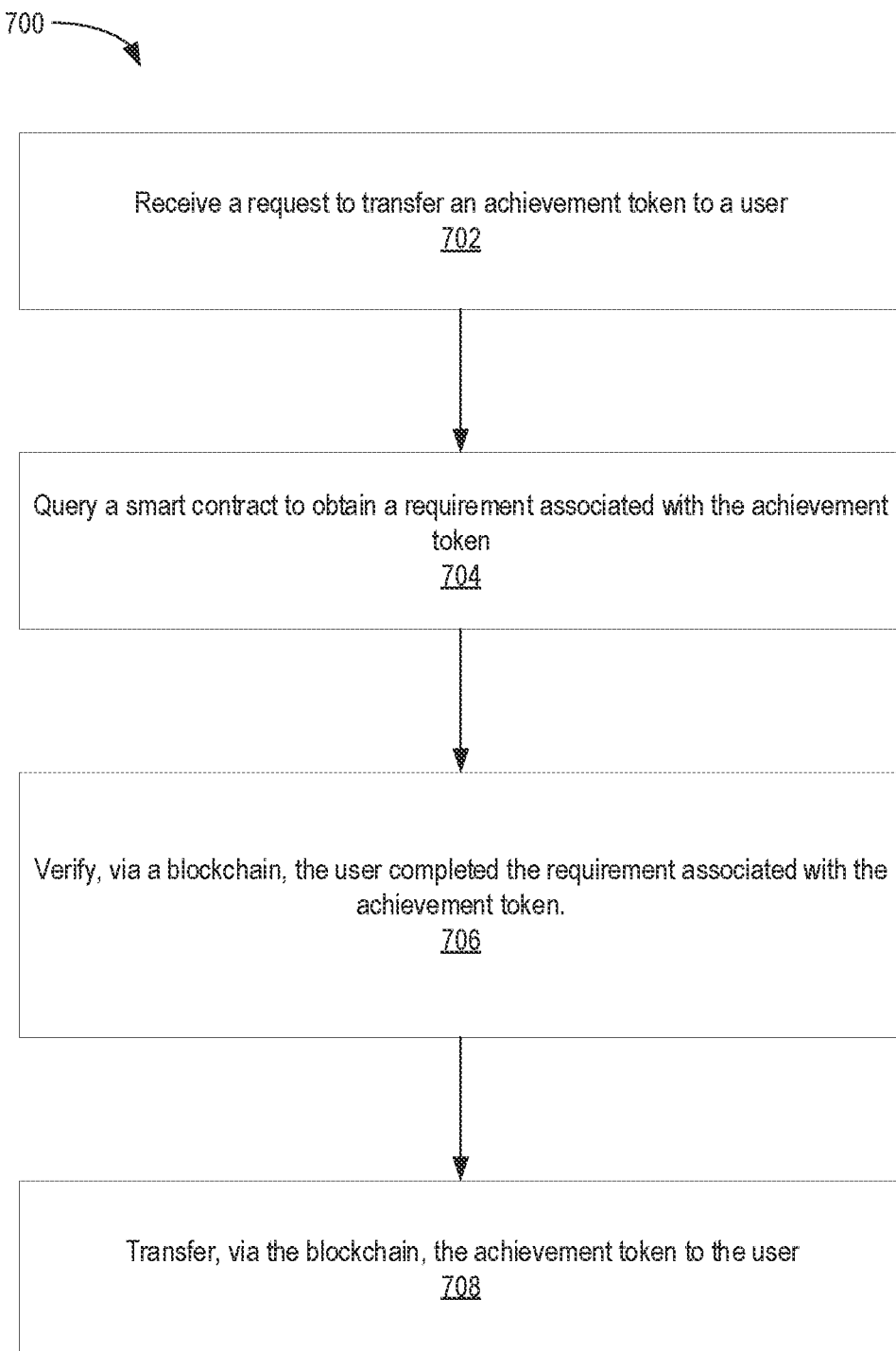
FIG. 7 depicts an example method for utilizing a blockchain and achievement token to improve compliance.

Example Method for Encoding Complain onto a Blockchain Using an Achievement Token FIG. 7 depicts an example method 700 for transferring an achievement token, such as with an achievement smart contract, for example, achievement smart contract 108, as described with respect to FIG. 1. Aspects of method 700 may be implemented by a dApp, such as dApp 106 in FIG. 1, dApp 303 in FIG. 3, dApp 503 in FIG. 5, dApp 605 in FIG. 6, or dApp 922 in FIG. 9C.

Method 700 begins at step 702 with receiving a request to transfer an achievement token to a user. For example, a user may request an achievement token 216a or 216b, as described in FIG. 2.

Method 700 proceeds to step 704 with querying a smart contract to obtain a requirement associated with the achievement token. In some examples, the smart contract is achievement smart contract 108 in FIG. 1.

Method 700 proceeds to step 706 with verifying, via a blockchain, the user completed the requirement associated with the achievement token. In some aspects, step 706 includes retrieving user evidence associated with the requirement associated with the achievement token from the blockchain; and storing user evidence with a transaction history associated with the transfer of the achievement token to the user. In some examples, the blockchain is blockchain 104 in FIG. 1.

In some embodiments, the user evidence is data associated with a third party with authority to record onto the blockchain, such as to encode standard compliance in off-chain activities.

Method 700 proceeds to step 708 with transferring, via the blockchain, the achievement token to the user. In some examples, the blockchain is blockchain 104 and the user is user 102 in FIG. 1.

In some embodiments, method 700 further comprises displaying the achievement token. For example, as depicted in FIG. 2, achievement token 216a and 216b are displayed on user interface 200.

In some embodiments, method 700 further comprises: receiving a request to audit the achievement token transfer to the user; querying the smart contract to obtain the requirement associated with the achievement token; requesting, via the blockchain, the transaction history associated with the achievement token transfer; and confirming the user evidence meets the requirement for the achievement token. In some examples, aspects of method 700 may be performed by achievement smart contract 108, as described in FIG. 1.

In some embodiments, method 700 further comprises: requesting, from the blockchain, metadata associated with the achievement token; and displaying the metadata associated with the achievement token.

In some embodiments, method 700 further comprises: requesting a new achievement token including a new requirement for obtaining the new achievement token; receiving, from a smart contract, a request to poll on the new achievement token; polling on the new achievement token comprising; soliciting, via the blockchain, votes from members of a decentralized autonomous organization; and recording, on the blockchain, the votes from the members of the decentralized autonomous organization; and adding the new achievement token to the smart contract. In some examples, aspects of method 700 may be performed by DAO smart contract 114, as described in FIG. 1.

In some embodiments, the achievement token is a fungible token. In some embodiments, the achievement token is an NFT.

Beneficially, method 700 provides a technical solution for improving standards compliance by recording and verifying standards compliance, in the form of achievement token requirements. Standard compliance is recorded on the accessible blockchain, allowing community members to readily view such records. Additionally, achievement tokens may indicate verified standards compliance, verified by an unalterable smart contract, reducing the need for independent and redundant verification.

Note that method 700 is just one example, and other methods including fewer, additional, or alternative steps, consistent with this disclosure, are possible.

Figure 8:
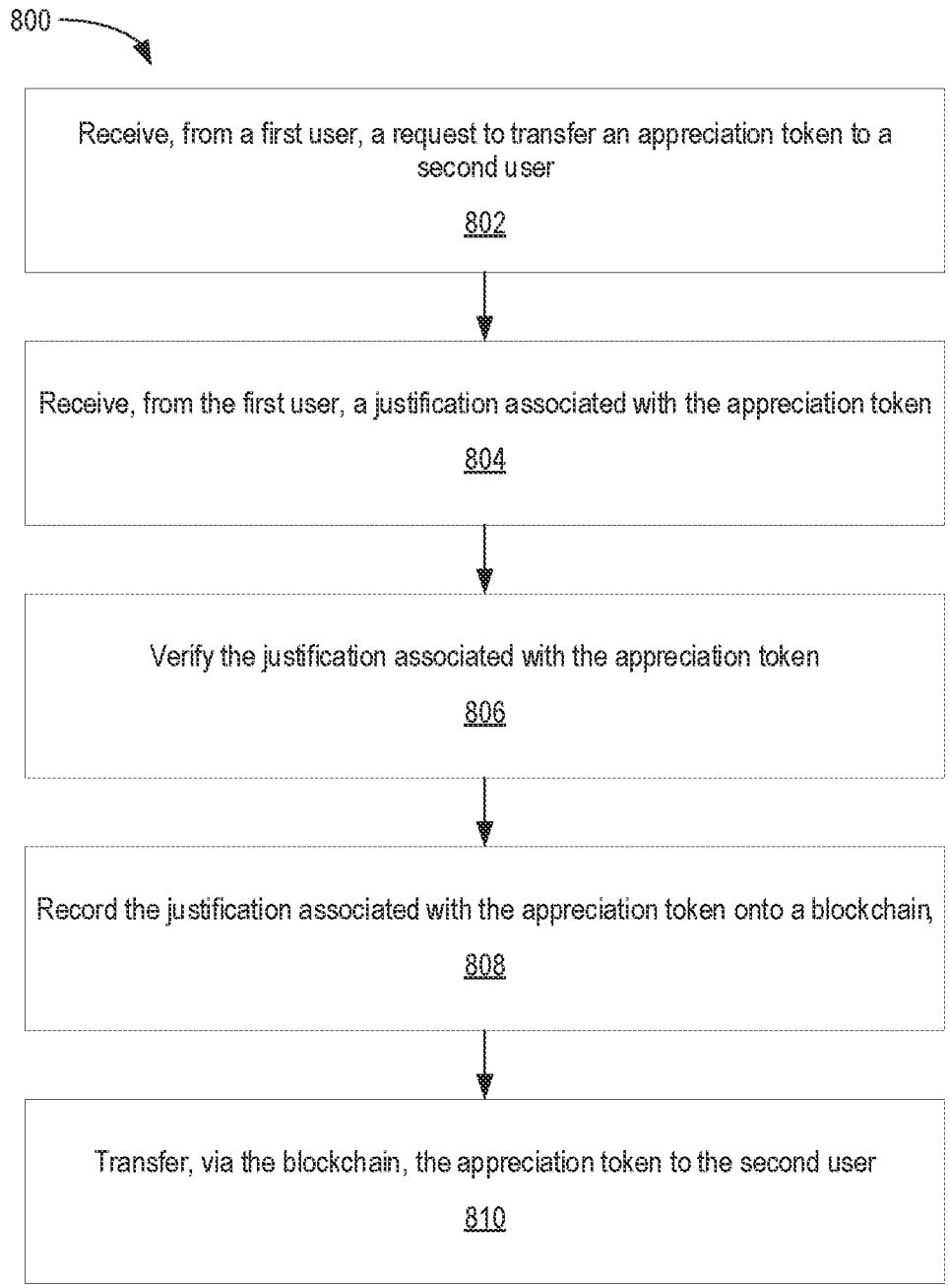
FIG. 8 depicts an example method for encoding compliance onto a blockchain using an appreciation token.

Example Method for Encoding Complain onto a Blockchain Using an Appreciation Token FIG. 8 depicts an example method 800 for transferring an appreciation token, such as with an appreciation smart contract, for example, appreciation smart contract 110, as described with respect to FIG. 1. Aspects of method 800 may be implemented by a dApp, such as dApp 106 in FIG. 1, dApp 403 in FIG. 4, dApp 503 in FIG. 5, dApp 605 in FIG. 6, or dApp 922 in FIG. 9C.

Method 800 begins at step 802 with receiving, from a first user, a request to transfer an appreciation token to a second user. For example, a user may request to transfer an appreciation token 218, as described in FIG. 2.

Method 800 proceeds to step 804 with receiving, from the first user, a justification associated with the appreciation token.

Method 800 proceeds to step 806 with verifying the justification associated with the appreciation token.

Method 800 proceeds to step 808 with recording the justification associated with the appreciation token onto a blockchain. In some aspects, step 808 includes: retrieving user evidence associated with the justification associated with the appreciation token from the blockchain; and storing user evidence with a transaction history associated with the transfer of the appreciation token to the second user.

In some embodiments, the justification is recorded before the appreciation token is transferred.

Method 800 proceeds to step 810 with transferring, via the blockchain, the appreciation token to the second user. In some examples, the blockchain is blockchain 104 in FIG. 1.

In some embodiments, method 800 further comprises: burning the appreciation token; determining an amount of user token equivalent to the appreciation token; and minting the amount of user token.

In some embodiments, the user token is a fungible token. In some embodiments, the appreciation token is a fungible token.

In some embodiments, method 800 further comprises transferring, via the blockchain, to the second user, the amount of user token. In some examples, the blockchain is blockchain 104 in FIG. 1.

In some embodiments, method 800 further comprises: receiving a request to audit the transfer of the appreciation token; querying a smart contract to obtain the justification associated with the appreciation token; requesting, via the blockchain, the transaction history associated with the transfer of the appreciation token to the second user; receiving the transaction history for the transfer of the appreciation token; and confirming the transaction history for the transfer of the appreciation token matches the justification.

In some embodiments, method 800 further comprises: requesting, from the blockchain, metadata associated with the appreciation token; and displaying the metadata associated with the appreciation token.

Beneficially, method 800 provides a technical solution for improving standards compliance by enabling community recognition and encouragement of standards compliance in a transparent and immutable record, via a blockchain and smart contracts. Additionally, by utilizing the blockchain and smart contracts, appreciation token may not be transferred for unjustified activities, such as where a standard is not met.

Note that method 800 is just one example, and other methods including fewer, additional, or alternative steps, consistent with this disclosure, are possible.

Example Processing System for Encoding Compliance onto the Blockchain

Figure 9A:
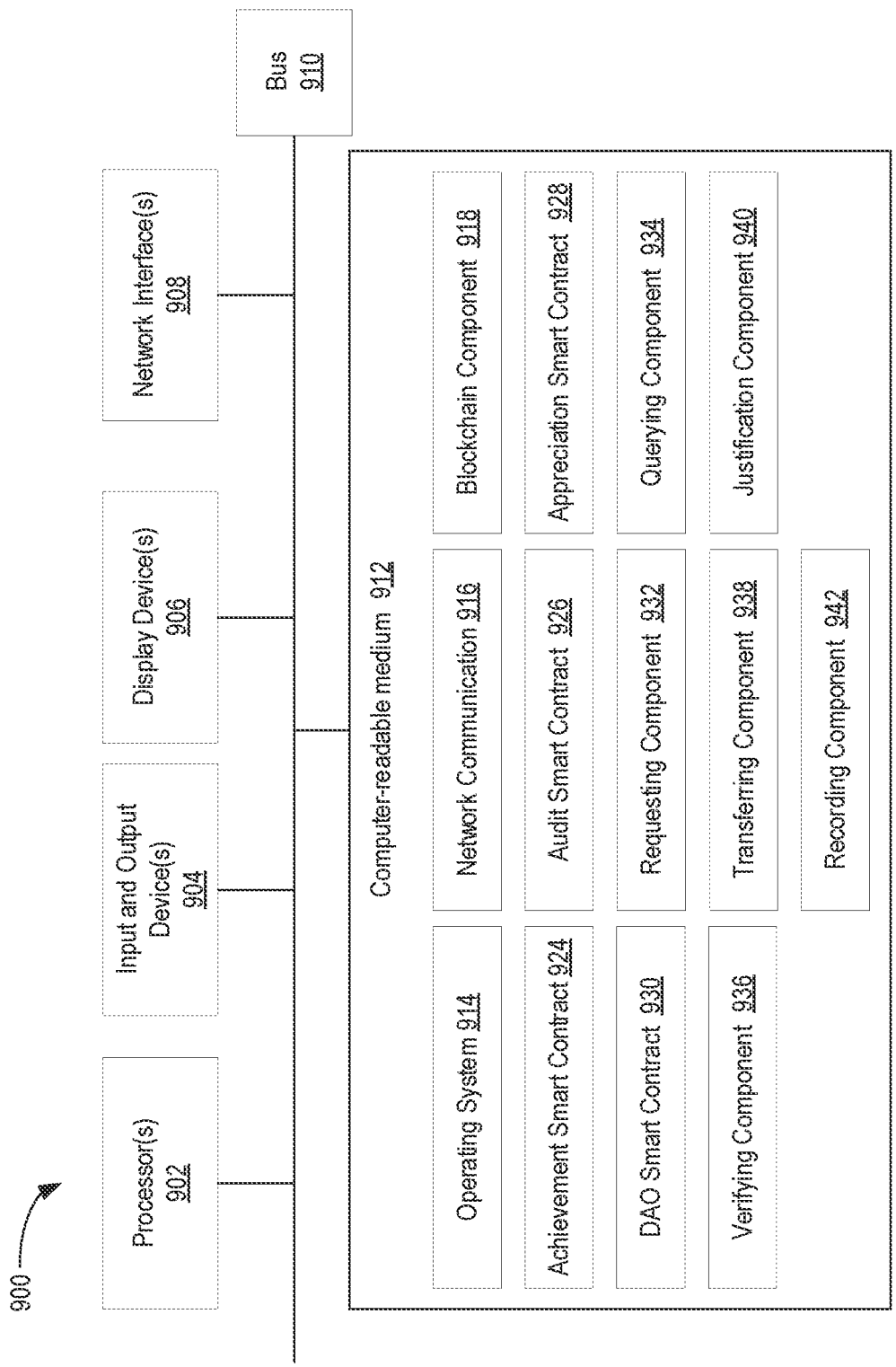
FIGS. 9A-9C depict example processing systems with which aspects of the present disclosure can be performed.
Figure 9B:
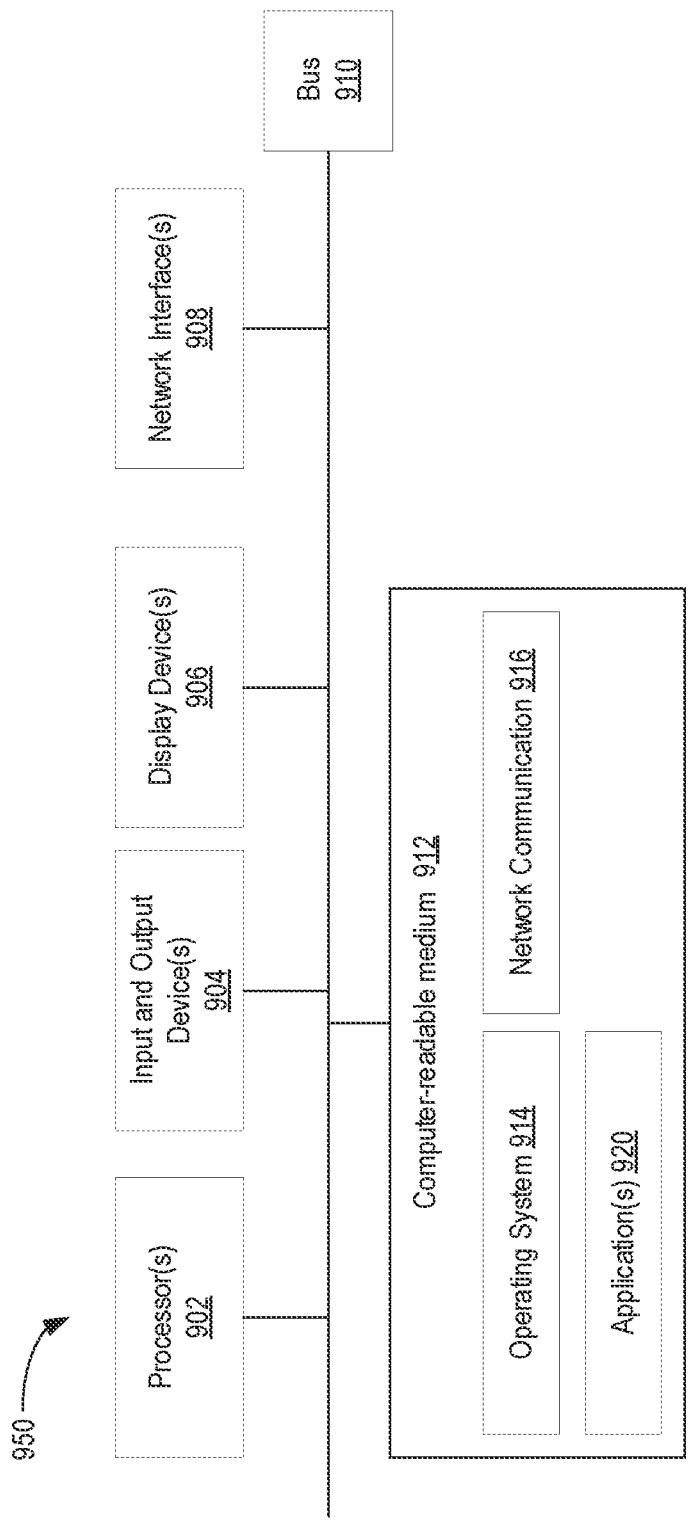

FIGS. 9A-9C depict example processing systems configured to perform various aspects described herein, including, for example, flows 300, 400, 500, and 600 as described above with respect to FIGS. 3-6 and methods 700 and 800 as described above with respect to FIGS. 7-9C.

In FIG. 9A, processing system 900 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 900 includes one or more processors 902, one or more input/output devices 904, one or more display devices 906, and one or more network interfaces 908 through which processing system 900 is connected to one or more networks (e.g., a local network, an intranet, the Internet, or any other group of processing systems communicatively connected to each other), and computer-readable medium 912.

In the depicted example, the aforementioned components are coupled by a bus 910, which may generally be configured for data and/or power exchange amongst the components. Bus 910 may be representative of multiple buses, while only one is depicted for simplicity.

Processor(s) 902 are generally configured to retrieve and execute instructions stored in one or more memories, including local memories like the computer-readable medium 912, as well as remote memories and data stores. Similarly, processor(s) 902 are configured to retrieve and store application data residing in local memories like the computer-readable medium 912, as well as remote memories and data stores. More generally, bus 910 is configured to transmit programming instructions and application data among the processor(s) 902, display device(s) 906, network interface(s) 908, and computer-readable medium 912. In certain embodiments, processor(s) 902 are included to be representative of a one or more central processing units (CPUs), graphics processing unit (GPUs), tensor processing unit (TPUs), accelerators, and other processing devices.

Input/output device(s) 904 may include any device, mechanism, system, interactive display, and/or various other hardware components for communicating information between processing system 900 and a user of processing system 900. For example, input/output device(s) 904 may include input hardware, such as a keyboard, touch screen, button, microphone, and/or other device for receiving inputs from the user. Input/output device(s) 904 may further include display hardware, such as, for example, a monitor, a video card, and/or other another device for sending and/or presenting visual data to the user. In certain embodiments, input/output device(s) 904 is or includes a graphical user interface.

Display device(s) 906 may generally include any sort of device configured to display data, information, graphics, user interface elements, and the like to a user. For example, display device(s) 906 may include internal and external displays such as an internal display of a tablet computer or an external display for a server computer or a projector. Display device(s) 906 may further include displays for devices, such as augmented, virtual, and/or extended reality devices.

Network interface(s) 908 provide processing system 900 with access to external networks and thereby to external processing systems. Network interface(s) 908 can generally be any device capable of transmitting and/or receiving data via a wired or wireless network connection. Accordingly, network interface(s) 908 can include a communication transceiver for sending and/or receiving any wired and/or wireless communication. For example, Network interface(s) 908 may include an antenna, a modem, a LAN port, a Wi-Fi card, a WiMAX card, cellular communications hardware, near-field communication (NFC) hardware, satellite communication hardware, and/or any wired or wireless hardware for communicating with other networks and/or devices/systems. In certain embodiments, network interface(s) 908 includes hardware configured to operate in accordance with the Bluetooth® wireless communication protocol.

Computer-readable medium 912 may be a volatile memory, such as a random access memory (RAM), or a nonvolatile memory, such as nonvolatile random access memory, phase change random access memory, or the like. In this example, computer-readable medium 912 includes various instructions for implementing an operating system 914, instructions for implementing network communication 916 to establish and maintain network connections, blockchain component 918, achievement smart contract 924, audit smart contract 926, appreciation smart contract 928, DAO smart contract 930, requesting component 932, querying component 934, verifying component 936, transferring component 938, justification component 940, and recording component 942.

In certain embodiments, blockchain component 918 is configured to execute transactions on the blockchain including transfers of tokens and operation of dApps and smart contracts. In some examples, blockchain component 918 may be blockchain 104, as described in FIG. 1.

In certain embodiments, achievement smart contract 924 is configured to operate and transfer achievement token, as in flow 300 described in FIG. 3. In some examples, achievement smart contract 924 may be achievement smart contract 108, as described in FIG. 1.

In certain embodiments, audit smart contract 926 is configured to audit transfers of token, as in flow 500 as described in FIG. 5. In some examples, audit smart contract 926 may be audit smart contract 112, as described in FIG. 1.

In certain embodiments, appreciation smart contract 928 is configured to operate and transfer appreciation token, as in flow 400 described in FIG. 4. In some examples, appreciation smart contract 928 may be appreciation smart contract 110, as described in FIG. 1.

In certain embodiments, DAO smart contract 930 is configured to operate a DAO, as in flow 600 described in FIG. 6. In some examples, DAO smart contract 930 may be DAO smart contract 114, as described in FIG. 1.

In certain embodiments, requesting component 932 is configured to receive a request to transfer an achievement token to a user, such as at step 702 in FIG. 7.

In certain embodiments, querying component 934 is configured to query a smart contract to obtain a requirement associated with the achievement token, such as at step 704 in FIG. 7.

In certain embodiments, verifying component 936 is configured to verify, via a blockchain, the user completed the requirement associated with the achievement token, comprising retrieving user evidence associated with the requirement associated with the achievement token from the blockchain storing user evidence with a transaction history associated with the transfer of the achievement token to the user, such as at step 706 in FIG. 7. In some embodiments, verifying component 936 is configured to verify the justification associated with the appreciation token, such as at step 806 in FIG. 8.

In certain embodiments, transferring component 938 is configured to transfer, via the blockchain, the achievement token to the user, such as at step 708 in FIG. 7. In some embodiments, transferring component 938 is configured to transfer, via the blockchain, the appreciation token to the second user, such as at step 810 in FIG. 8.

In certain embodiments, justification component 940 is configured to receive, from the first user, a justification associated with the appreciation token, such as at step 804 in FIG. 8.

In certain embodiments, recording component 942 is configured to record the justification associated with the appreciation token onto a blockchain, comprising: retrieving user evidence associated with the justification associated with the appreciation token from the blockchain; and storing user evidence with a transaction history associated with the transfer of the appreciation token to the second user, such as at step 808 in FIG. 8.

FIG. 9B depicts another example processing system 950 for performing one or more aspects of the flows and methods described herein. Components 902-912 may operate as generally described above with reference to FIG. 9A.

In this example processing system 950, computer-readable medium 912 includes various instructions for implementing an operating system 914, instructions for implementing network communication 916 to establish and maintain network connections, and one or more applications 920.

Figure 9C:
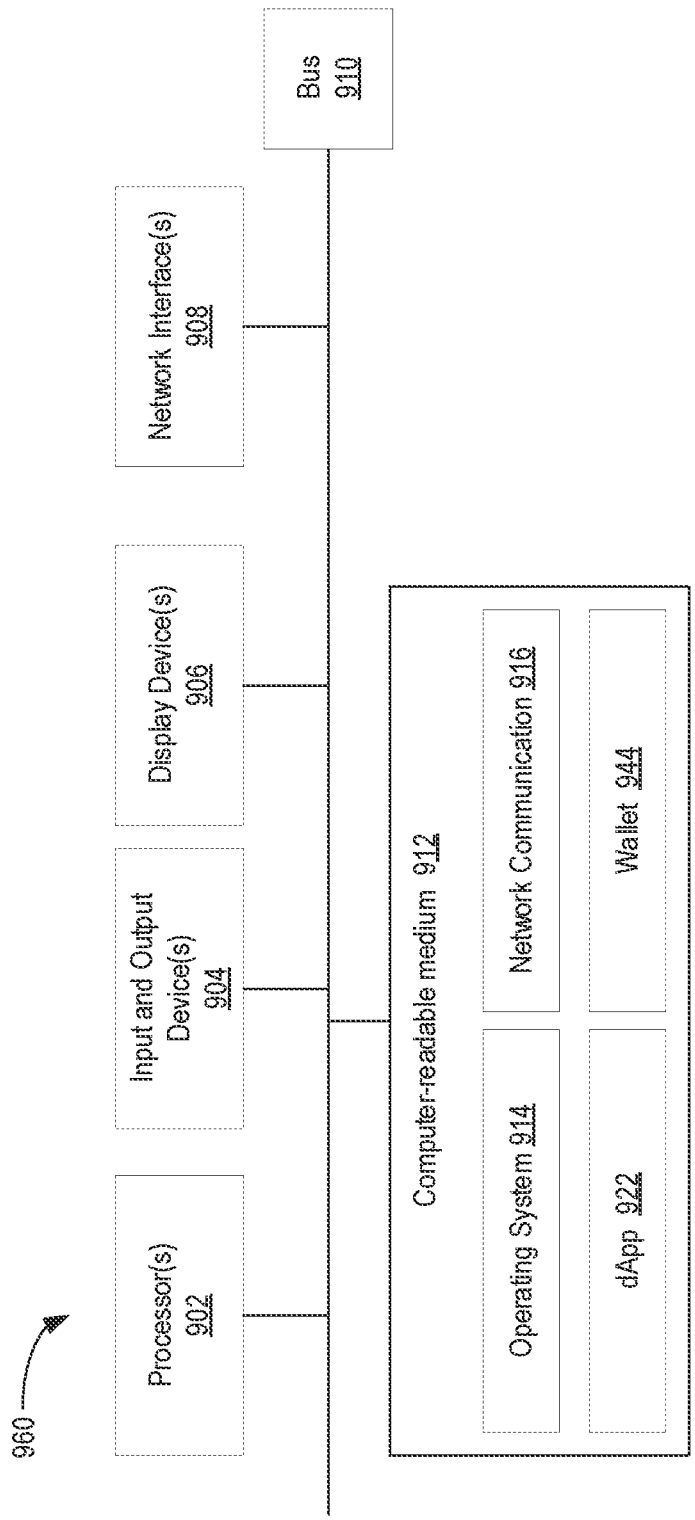

FIG. 9C depicts another example processing system 960 for performing one or more aspects of the flows and methods described herein. Components 902-912 may operate as generally described above with reference to FIG. 9A.

In this example processing system 960, computer-readable medium 912 includes various instructions for implementing an operating system 914, instructions for implementing network communication 916 to establish and maintain network connections, dApp 922, and wallet 944.

In certain embodiments, dApp component 922 is configured to operate and execute various methods described herein, including methods 700 and 800 as described above with respect to FIGS. 7-8. In some examples, dApp component 922 may be dApp 106, as described in FIG. 1.

In certain embodiments, wallet 944, such as wallet 220 in FIG. 2, is configured to provide a public wallet address, for receiving token, such as achievement token (e.g., achievement token 216a or achievement token 216b in FIG. 2), appreciation token (e.g., 218 in FIG. 2), or user token.

Note that FIGS. 9A-9C are just examples of processing systems consistent with aspects described herein, and other processing systems having additional, alternative, or fewer components are possible consistent with this disclosure.

Example Clauses

Implementation examples are described in the following numbered clauses:

Clause 1: A method, comprising: receiving a request to transfer an achievement token to a user; querying a smart contract to obtain a requirement associated with the achievement token; verifying, via a blockchain, the user completed the requirement associated with the achievement token, comprising; retrieving user evidence associated with the requirement associated with the achievement token from the blockchain; and storing user evidence with a transaction history associated with the transfer of the achievement token to the user; and transferring, via the blockchain, the achievement token to the user.

Clause 2: The method of any one of Clauses 1-1, wherein the user evidence is data associated with a third party with authority to record onto the blockchain.

Clause 3: The method of any one of Clauses 1-1, further comprising displaying the achievement token.

Clause 4: The method of any one of Clauses 1-1, further comprising: receiving a request to audit the achievement token transfer to the user; querying the smart contract to obtain the requirement associated with the achievement token; requesting, via the blockchain, the transaction history associated with the achievement token transfer; and confirming the user evidence meets the requirement for the achievement token.

Clause 5: The method of any one of Clauses 1-1, further comprising: requesting, from the blockchain, metadata associated with the achievement token; and displaying the metadata associated with the achievement token.

Clause 6: The method of any one of Clauses 1-1, further comprising: requesting a new achievement token including a new requirement for obtaining the new achievement token; receiving, from a smart contract, a request to poll on the new achievement token; polling on the new achievement token comprising; soliciting, via the blockchain, votes from members of a decentralized autonomous organization; and recording, on the blockchain, the votes from the members of the decentralized autonomous organization; and adding the new achievement token to the smart contract.

Clause 7: A method, comprising: receiving, from a first user, a request to transfer an appreciation token to a second user; receiving, from the first user, a justification associated with the appreciation token; verifying the justification associated with the appreciation token; recording the justification associated with the appreciation token onto a blockchain, comprising: retrieving user evidence associated with the justification associated with the appreciation token from the blockchain; and storing user evidence with a transaction history associated with the transfer of the appreciation token to the second user; and transferring, via the blockchain, the appreciation token to the second user.

Clause 8: The method of any one of Clauses 1-7, further comprising: burning the appreciation token; determining an amount of user token equivalent to the appreciation token; and minting the amount of user token.

Clause 9: The method of any one of Clauses 7-8, further comprising: receiving a request to audit the transfer of the appreciation token; querying a smart contract to obtain the justification associated with the appreciation token; requesting, via the blockchain, the transaction history associated with the transfer of the appreciation token to the second user; receiving the transaction history for the transfer of the appreciation token; and confirming the transaction history for the transfer of the appreciation token matches the justification.

Clause 10: The method of any one of Clauses 7-9, further comprising: requesting, from the blockchain, metadata associated with the appreciation token; and displaying the metadata associated with the appreciation token.

Clause 11: The method of Clause 8, wherein, the user token is a fungible token.

Clause 12: The method of any one of Clauses 7-11, further comprising transferring, via the blockchain, to the second user, the amount of user token.

Clause 13: The method of any one of Clauses 7-12, wherein the justification must be recorded before the appreciation token is transferred.

Clause 14: The method of any one of Clauses 7-13, wherein the appreciation token is a fungible token.

Clause 15: A processing system, comprising: a memory comprising computer-executable instructions; and a processor configured to execute the computer-executable instructions and cause the processing system to perform a method in accordance with any one of Clauses 1-14.

Clause 15: A processing system, comprising means for performing a method in accordance with any one of Clauses 1-14.

Clause 16: A non-transitory computer-readable medium comprising computer-executable instructions that, when executed by a processor of a processing system, cause the processing system to perform a method in accordance with any one of Clauses 1-14.

Clause 17: A computer program product embodied on a computer-readable storage medium comprising code for performing a method in accordance with any one of Clauses 1-14.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving a request to transfer an achievement token to a user;
querying an achievement smart contract to obtain a requirement associated with the achievement token;
verifying, via a blockchain, the user completed the requirement associated with the achievement token, comprising:
retrieving user evidence associated with the requirement associated with the achievement token from the blockchain, wherein the user evidence evidences the user complies with the requirement; and
storing the user evidence with a transaction history associated with the transfer of the achievement token to the user;
transferring, via the blockchain, the achievement token to the user; and
in response to receiving a request to audit the transfer of the achievement token to the user, auditing the transfer of the achievement token, comprising:
obtaining the requirement associated with the achievement token from the achievement smart contract;
requesting, via the blockchain, the transaction history and the stored user evidence associated with the transfer of the achievement token, and
comparing the stored user evidence with the requirement associated with the achievement token to confirm the user evidence meets the requirement for the achievement token.

2. The method of claim 1, further comprising displaying the achievement token.

3. The method of claim 1, further comprising:
requesting, from the blockchain, metadata associated with the achievement token; and
displaying the metadata associated with the achievement token.

4. The method of claim 3, wherein the achievement token comprises a non-fungible token.

5. The method of claim 1, further comprising:
requesting a new achievement token including a new requirement for obtaining the new achievement token;
receiving, from a decentralized autonomous organization smart contract, a request to poll on the new achievement token;
polling on the new achievement token, comprising:
soliciting, via the blockchain, votes from members of a decentralized autonomous organization; and
recording, on the blockchain, the votes from the members of the decentralized autonomous organization; and
adding the new achievement token to the achievement smart contract.

6. The method of claim 1, wherein:
the requirement associated with the achievement token comprises deployment of a new smart contract on the blockchain, and
the new smart contract employs a new technological standard.

7. The method of claim 1, wherein:
the user evidence comprises the data associated with a third party with authority to record onto the blockchain,
the data comprises a transaction signed by the third party, and
the third party comprises a remote service.

8. The method of claim 7, wherein the data associated with the third party with authority to record onto the blockchain further comprises an indication of an off-chain activity associated with the remote service.

9. The method of claim 1, wherein the request to audit the transfer of the achievement token to the user is associated with a second user.

10. The method of claim 1, wherein the achievement token comprises a fungible token.

11. A processing system, comprising: a memory comprising computer-executable instructions; and a processor configured to execute the computer-executable instructions and cause the processing system to:
receive a request to transfer an achievement token to a user;
query an achievement smart contract to obtain a requirement associated with the achievement token;
verify, via a blockchain, the user completed the requirement associated with the achievement token, comprising:
retrieve user evidence associated with the requirement associated with the achievement token from the blockchain, wherein the user evidence evidences the user complies with the requirement; and
store user evidence with a transaction history associated with the transfer of the achievement token to the user;
transfer, via the blockchain, the achievement token to the user; and
in response to receiving a request to audit the transfer of the achievement token to the user, audit the transfer of the achievement token, comprising:
obtain the requirement associated with the achievement token from the achievement smart contract,
request via the blockchain, the transaction history and the stored user evidence associated with the transfer of the achievement token; and
compare the stored user evidence with the requirement associated with the achievement token to confirm the user evidence meets the requirement for the achievement token.

12. The processing system of claim 11, wherein the processor is further configured to cause the processing system to display the achievement token.

13. The processing system of claim 11, wherein the processor is further configured to cause the processing system to:
request, from the blockchain, metadata associated with the achievement token; and
display the metadata associated with the achievement token.

14. The processing system of claim 11, wherein the processor is further configured to cause the processing system to:
request a new achievement token including a new requirement for obtaining the new achievement token;
receive, from a decentralized autonomous organization smart contract, a request to poll on the new achievement token;
poll on the new achievement token, comprising:
solicit, via the blockchain, votes from members of a decentralized autonomous organization; and
record, on the blockchain, the votes from the members of the decentralized autonomous organization; and
add the new achievement token to the achievement smart contract.

15. The processing system of claim 11, wherein:
the requirement associated with the achievement token comprises deployment of a new smart contract on the blockchain, and
the new smart contract employs a new technological standard.

16. The processing system of claim 11, wherein:
the user evidence comprises data associated with a third party with authority to record onto the blockchain,
the data comprises a transaction signed by the third party, and
the third party comprises a remote service.

17. The processing system of claim 16, wherein the data associated with the third party with authority to record onto the blockchain further comprises an indication of an off-chain activity associated with the remote service.

18. The processing of claim 11, wherein the request to audit the transfer of the achievement token to the user is associated with a second user.

19. The processing system of claim 11, wherein the achievement token comprises a non-fungible token.

20. The processing system of claim 11, wherein the achievement token comprises a fungible token.

* * * * *